United States Patent
Chalin et al.

(10) Patent No.: US 6,957,819 B2
(45) Date of Patent: Oct. 25, 2005

(54) LIFT AXLE PARALLELOGRAM SUSPENSION SYSTEM

(75) Inventors: Thomas N. Chalin, Fairview, TX (US); Cully B. Dodd, McKinney, TX (US); Herbert D. Hudson, McKinney, TX (US)

(73) Assignee: Watson & Chalin Manufacturing, Inc., McKinney, TX (US)

( * ) Notice: Subject to any disclaimer, the term of this patent is extended or adjusted under 35 U.S.C. 154(b) by 209 days.

(21) Appl. No.: 10/600,692

(22) Filed: Jun. 20, 2003

(65) Prior Publication Data

US 2004/0256820 A1  Dec. 23, 2004

(51) Int. Cl.[7] ............................ B60G 9/02; B62D 61/12
(52) U.S. Cl. ................ 280/86.5; 280/788; 280/124.116
(58) Field of Search ........................ 280/86.5, 124.116, 280/124.128, 124.13, 124.157, 788, 683

(56) References Cited

U.S. PATENT DOCUMENTS

| | | | |
|---|---|---|---|
| 4,465,300 A | | 8/1984 | Raidel |
| 4,802,690 A | * | 2/1989 | Raidel ................. 280/124.157 |
| 4,858,948 A | | 8/1989 | Raidel |
| 5,230,528 A | | 7/1993 | Van Raden et al. |
| 6,073,946 A | | 6/2000 | Richardson |
| 6,073,947 A | | 6/2000 | Gottschalk et al. |
| 6,135,470 A | | 10/2000 | Dudding |

FOREIGN PATENT DOCUMENTS

JP  04278884 A  * 10/1992  .......... B62D 21/00

OTHER PUBLICATIONS

Ridewell Corp. Drawing No. AS-7674D, dated Apr. 12, 1994.

* cited by examiner

*Primary Examiner*—Peter C. English
(74) *Attorney, Agent, or Firm*—Konneker & Smith, P.C.

(57) ABSTRACT

A lift axle parallelogram suspension system. In a described embodiment, a suspension system for a vehicle having a generally longitudinally extending frame includes an axle assembly and upper and lower trailing arms. One end of each of the upper and lower arms is attached to the frame at a pivot connection, and an opposite end of the arm is attached to the axle assembly at another pivot connection. Each of the arms is angled laterally outward from the frame as the arm extends from the frame pivot connection to the axle assembly pivot connection.

51 Claims, 2 Drawing Sheets

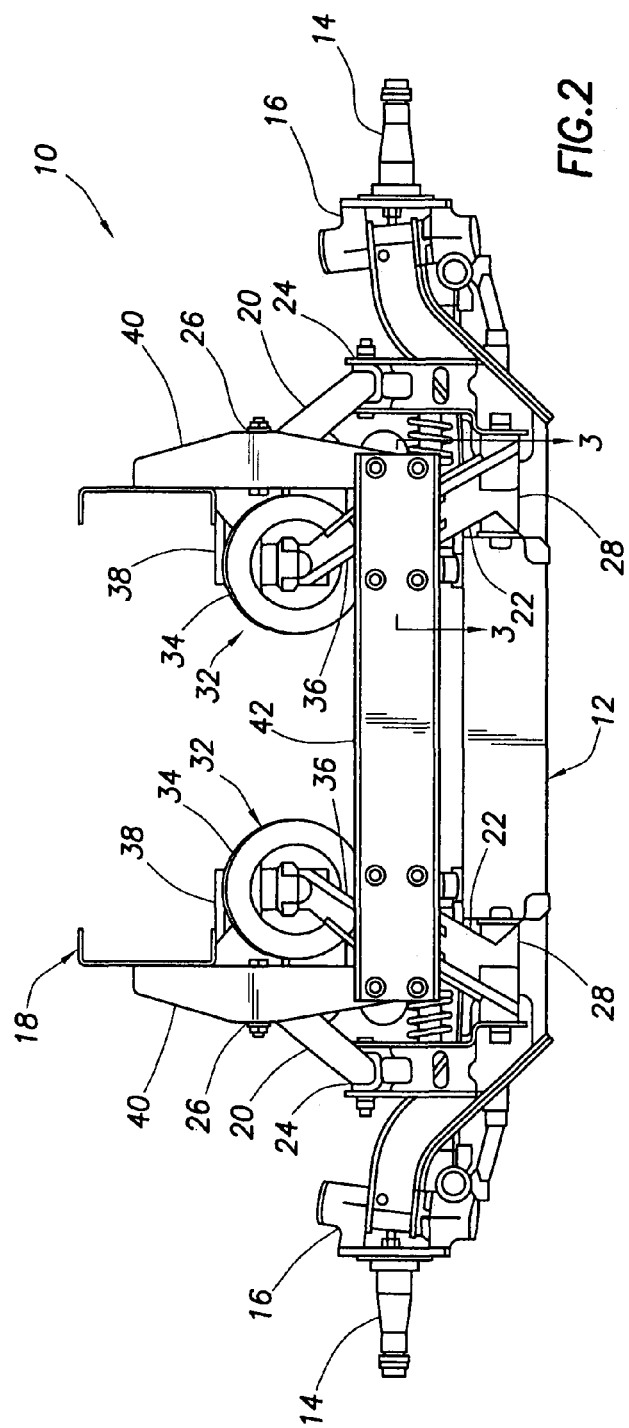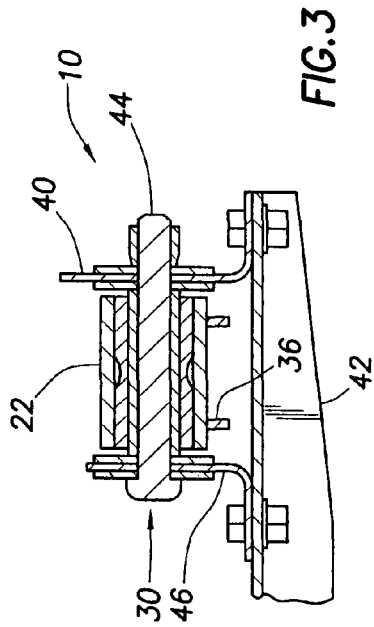

LIFT AXLE PARALLELOGRAM SUSPENSION SYSTEM

BACKGROUND

The present invention relates generally to vehicle suspension systems and, in an embodiment described herein, more particularly provides a lift axle parallelogram suspension system.

It has become increasingly important in the suspension system market to provide suspension systems which weigh less and support equivalent or increased loads. Thus, suspension system configurations which accomplish these goals at the same time are highly desirable.

One problem in the suspension system art is how to resist lateral forces applied to an axle assembly. Such lateral forces may result from vehicle cornering, articulation of the axle assembly, etc., and can, for example, cause premature wear of pivot bushings or other components of the suspension system. An improved suspension system would preferably provide for resisting lateral forces, without increasing the weight of the suspension system significantly, or at all.

From the foregoing, it can be seen that it would be quite desirable to provide an improved suspension system. In particular, there is a need for suspension systems, such as lift axle parallelogram suspension systems, which have increased load carrying capacities, reduced weight, and which satisfactorily resist lateral forces applied thereto. Therefore, one object of the present invention is to provide a suspension system which accomplishes at least one of these goals.

SUMMARY

In carrying out the principles of the present invention, in accordance with an embodiment thereof, a suspension system is provided which is uniquely configured to satisfy the above needs in the art. The suspension system is relatively light in weight for its load carrying capacity, and includes features which enable it to effectively resist lateral forces applied to its axle assembly.

In one aspect of the invention, a suspension system for a vehicle having a generally longitudinally extending frame is provided. The suspension system includes an axle assembly and upper and lower trailing arms. One end of each of the upper and lower arms is attached to the frame at a pivot connection, and an opposite end of the arm is attached to the axle assembly at another pivot connection. Each of the arms is angled laterally outward from the frame as the arm extends from the frame pivot connection to the axle assembly pivot connection.

In another aspect of the invention, another suspension system for a vehicle having a generally longitudinally extending frame is provided. The suspension system includes an axle assembly, hanger brackets attached to the frame and extending downwardly therefrom, and a crossmember attached to the hanger brackets. At least one trailing arm is pivotably connected to one of the hanger brackets at a pivot connection, and is pivotably connected to the axle assembly. The pivot connection extends between the hanger bracket and the crossmember.

In yet another aspect of the invention, the crossmember and each of the hanger brackets, or any of them, may be made of a composite material. The components may be integrally formed, or formed as separate pieces and then attached to each other.

These and other features, advantages, benefits and objects of the present invention will become apparent to one of ordinary skill in the art upon careful consideration of the detailed description of a representative embodiment of the invention hereinbelow and the accompanying drawings.

BRIEF DESCRIPTION OF THE DRAWINGS

FIG. 2 is a front elevational view of the suspension system of FIG. 1; and

FIG. 3 is a cross-sectional view, taken along line 3—3 of FIG. 2, showing an arm pivot connection of the suspension system.

DETAILED DESCRIPTION

Figure 1:
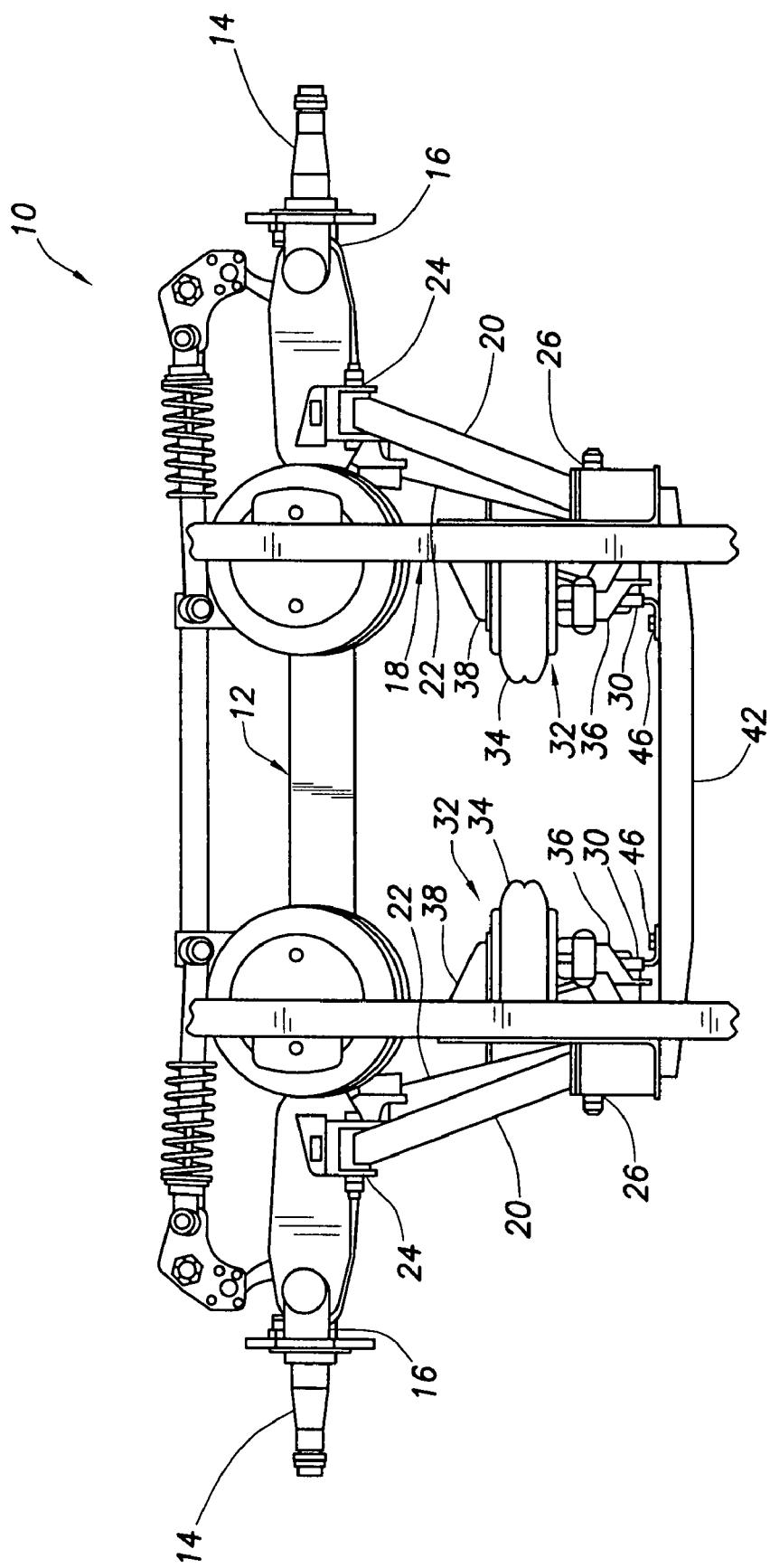
FIG. 1 is a top plan view of a lift axle parallelogram suspension system embodying principles of the present invention.

Representatively illustrated in FIGS. 1 & 2 is a suspension system 10 which embodies principles of the present invention. In the following description of the suspension system 10 and other apparatus and methods described herein, directional terms, such as "above", "below", "upper", "lower", etc., are used only for convenience in referring to the accompanying drawings. Additionally, it is to be understood that the embodiment of the present invention described herein may be utilized in various orientations and in various configurations, without departing from the principles of the present invention.

The suspension system 10 includes a generally laterally extending axle assembly 12 having spindles 14 at outer ends thereof for mounting conventional hubs and wheels (not shown) to the suspension system in a manner well known to those skilled in the art. The suspension system 10 is steerable, the spindles 14 being pivotably mounted using yokes 16. Note that the principles of the invention may be incorporated into suspension systems which are not steerable, as well.

The axle assembly 12 is connected to a vehicle frame 18 by means of upper and lower trailing arms 20, 22. At each end of the suspension system 10, an upper arm 20 is pivotably connected to the axle assembly at a pivot connection 24, and pivotably connected to the frame 18 at a pivot connection 26. Similarly, at each end of the suspension system 10, a lower arm 22 is pivotably connected to the axle assembly 12 at a pivot connection 28, and pivotably connected to the frame 18 at a pivot connection 30.

Preferably, the suspension system 10 is a parallelogram-type suspension system in which the upper and lower arms 20, 22 are vertically spaced apart and remain substantially parallel to each other, in the vertical plane, as the axle assembly 12 displaces vertically relative to the frame 18. The suspension system 10 could, for example, be of the type known to those skilled in the art as a modified parallelogram suspension system. Thus, the pivot connections 24, 26, 28, 30 on each side of the suspension system 10 may form the vertices of a parallelogram. However, it should be clearly understood that the principles of the invention may be incorporated into suspension systems other than parallelogram-type suspension systems, since the invention is not limited to any specific details of the suspension system 10 described herein.

The suspension system 10 also includes a lift mechanism 32 on each side of the suspension system. Each of the lift mechanisms 32 includes a lift air spring 34 and a lever arm 36. Each of the lift air springs 34 is connected between one of the lever arms 36 and a bracket 38 attached to the frame 18.

Each of the lever arms 36 is connected between one of the lift air springs 34 and one of the pivot connections 30 of the lower arms 22. As the lift air springs 34 are expanded, the lever arms 36 pivot forward at the pivot connections 30, thereby pivoting the lower arms 22 upward at the axle assembly 12, and raising the axle assembly relative to the frame 18.

The pivot connections 26 between the upper arms 20 and the frame 18 are located at hanger brackets 40 attached to each side of the frame 18 and extending downwardly therefrom. A crossmember 42 extends laterally relative to the frame 18 and is rigidly attached to lower ends of the hanger brackets 40.

To reduce weight in the suspension system 10, the crossmember 42 and/or hanger brackets 40 may be made of a composite material. As used herein, the term "composite material" is used to indicate a material consisting of two or more constituents, insoluble in one another, which are combined to form the material possessing certain properties not possessed by the individual constituents. Examples of composite materials include glass or carbon fibers in a resin matrix, etc. However, the crossmember 42 and/or hanger brackets 40 may be made of other materials, such as steel, aluminum, etc., in keeping with the principles of the invention.

If the crossmember 42 and hanger brackets 40 are made of a composite material, they may be integrally formed as a single piece, for example, by molding, etc., or they could be separately formed and then attached to each other by adhesively bonding the crossmember to each of the hanger brackets, or by using fasteners or another attachment method.

The crossmember 42 structurally ties the hanger brackets 40 to each other, providing increased resistance to lateral forces applied to the hanger brackets. In a unique feature of the invention, the crossmember 42 also acts to support the lower pivot connections 30, in conjunction with the hanger brackets 40.

FIG. 3 representatively illustrates a cross-section of one of the pivot connections 30. In this view it may be seen that the pivot connection 30 includes a pivot pin 44 (depicted in FIG. 3 as a fastener of the type known to those skilled in the art as a "huck") about which the trailing arm 22 and lever arm 36 rotate. Note that the pivot pin 44 may be other than a fastener and other than a "huck", and that other types of pivot connections may be used, without departing from the principles of the invention.

The pivot pin 44 extends through the hanger bracket 40 on one side of the pivot connection 30, and extends through a pivot mounting bracket 46 on the crossmember 42 on the other side of the pivot connection. The bracket 46 is depicted in FIG. 3 as being separately attached to the crossmember 42, but the bracket could be integrally formed on the crossmember, or otherwise connected to the crossmember, if desired.

Thus, it may be clearly seen that the lower arm 22, and the pivot connection 30 thereof, is supported between the hanger bracket 40 and the crossmember 42. This configuration advantageously uses the crossmember 42 to both aid in resisting lateral forces applied to the suspension system 10, and to support the pivot connection 30 of the lower arm 22. Accordingly, the hanger brackets 40 of the suspension system 10 may be significantly lighter in weight as compared to previous suspension systems.

Another unique feature of the invention which aids in resisting lateral forces applied to the suspension system 10 is the configuration of the upper and lower arms 20, 22 relative to the frame 18. As depicted in FIG. 1, the upper arms 20 are angled laterally outward relative to the frame 18 as the arms extend from the pivot connections 26 at the frame to the pivot connections 24 at the axle assembly 12. The lower arms 22 are also angled laterally outward relative to the frame 18 as the arms extend from the pivot connections 30 at the frame to the pivot connections 28 at the axle assembly 12.

Note that the upper arms 20 are angled outward greater than the lower arms 22 are angled outward relative to the frame 18. The pivot connections 24 of the upper arms 20 to the axle assembly 12 are spaced laterally apart greater than the pivot connections 28 of the lower arms 22 to the axle assembly, and the pivot connections 26 of the upper arms to the hanger brackets 40 are spaced laterally apart greater than the pivot connections 30 of the lower arms to the hanger brackets and crossmember 42.

However, the difference in angular orientation between the arms 20, 22 described above and shown in the drawings is not necessary in keeping with the principles of the invention. For example, the arms 20, 22 could be angled the same relative to the frame 18, or the lower arms could be angled outward greater than the upper arms.

Of course, a person skilled in the art would, upon a careful consideration of the above description of a representative embodiment of the invention, readily appreciate that many modifications, additions, substitutions, deletions, and other changes may be made to this specific embodiment, and such changes are contemplated by the principles of the present invention. Accordingly, the foregoing detailed description is to be clearly understood as being given by way of illustration and example only, the spirit and scope of the present invention being limited solely by the appended claims and their equivalents.

What is claimed is:

1. A suspension system for a vehicle having a generally longitudinally extending frame, the suspension system comprising:

an axle assembly;

an upper trailing arm, one end of the upper arm being attached to the frame at a first pivot connection, and an opposite end of the upper arm being attached to the axle assembly at a second pivot connection, the upper arm being angled laterally outward from the frame as the upper arm extends from the first to the second pivot connection;

a lower trailing arm, one end of the lower arm being attached to the frame at a third pivot connection, and an opposite end of the lower arm being attached to the axle assembly at a fourth pivot connection, the lower arm being angled laterally outward from the frame as the lower arm extends from the third to the fourth pivot connection; and first and second hanger brackets attached to the frame and extending downwardly therefrom, each of the first and second hanger brackets being made of a composite material.

2. The suspension system according to claim 1, wherein the upper and lower trailing arms remain substantially parallel to each other as the axle assembly displaces vertically relative to the frame.

3. The suspension system according to claim 1, wherein the first, second, third and fourth pivot connections form vertices of a parallelogram.

4. The suspension system according to claim 1, further comprising a lift mechanism for lifting the axle assembly vertically relative to the frame.

5. The suspension system according to claim 4, wherein the lift mechanism includes a lever arm attached to the third pivot connection.

6. The suspension system according to claim 5, wherein the lift mechanism further includes a lift air spring connected between the frame and the lever arm.

7. The suspension system according to claim 1, further comprising crossmember connected between the first and second hanger brackets.

8. The suspension system according to claim 7, wherein the third pivot connection comprises the lower trailing arm pivotably supported between the first hanger bracket and the crossmember.

9. The suspension system according to claim 7, wherein the crossmember is made of a composite material.

10. The suspension system according to claim 1, wherein the upper and lower arms are pivotably connected to the first hanger bracket at the first and third pivot connections, respectively.

11. The suspension system according to claim 1, wherein the second and fourth pivot connections are laterally offset relative to each other.

12. The suspension system according to claim 1, wherein the first and third pivot connections are laterally offset relative to each other.

13. The suspension system according to claim 1, wherein each of the upper and lower trailing arms is angled laterally outward relative to the frame as the arm extends from the frame to the axle assembly, and wherein one of the upper and lower arms is angled laterally outward relative to the frame greater than the other of the upper and lower arms.

14. A suspension system for a vehicle having a generally longitudinally extending frame, the suspension system comprising:
   an axle assembly;
   first and second hanger brackets attached to the frame and extending downwardly therefrom;
   a crossmember attached to each of the first and second hanger brackets, the crossmember being made of a composite material; and
   at least one first trailing arm pivotably connected to the first hanger bracket at a pivot connection, the pivot connection extending between the first hanger bracket and the crossmember, and the first trailing arm further being pivotably connected to the axle assembly.

15. The suspension system according to claim 14, wherein the pivot connection includes a pivot pin extending between the first hanger bracket and a pivot mounting bracket of the crossmember.

16. The suspension system according to claim 14, further comprising at least one second trailing arm, the first and second trailing arms being vertically spaced apart and remaining substantially parallel to each other as the axle assembly displaces vertically relative to the frame.

17. The suspension system according to claim 14, further comprising a lift mechanism for lifting the axle assembly vertically relative to the frame.

18. The suspension system according to claim 17, wherein the lift mechanism includes a lever arm attached to the pivot connection.

19. The suspension system according to claim 18, wherein the lift mechanism further includes a lift air spring connected between the frame and the lever arm.

20. The suspension system according to claim 14, further comprising at least one second trailing arm vertically spaced apart from the first trailing arm, the second trailing arm being pivotably connected to the axle assembly and to the first hanger bracket, each of the first and second trailing arms being angled laterally outward relative to the frame as the arm extends from the frame to the axle assembly.

21. The suspension system according to claim 20, wherein one of the first and second arms is angled laterally outward relative to the frame greater than the other of the first and second arms.

22. The suspension system according to claim 14, wherein the first and second hanger brackets are made of a composite material.

23. A suspension system for a vehicle having a generally longitudinally extending frame, the suspension system comprising:
   an axle assembly;
   first and second hanger brackets attached to the frame and extending downwardly therefrom;
   a crossmember attached to each of the first and second hanger brackets; and
   at least one first trailing arm pivotably connected to the first hanger bracket at a pivot connection, and the first trailing arm further being connected to the axle assembly,
   the crossmember and each of the first and second hanger brackets being made of a composite material.

24. The suspension system according to claim 23, wherein the crossmember and the first and second hanger brackets are integrally formed as a single piece.

25. The suspension system according to claim 23, wherein the crossmember, the first hanger bracket and the second hanger bracket are formed as separate pieces.

26. The suspension system according to claim 23, wherein the pivot connection extends between the first hanger bracket and the crossmember.

27. The suspension system according to claim 23, wherein the first trailing arm is pivotably connected to the axle assembly.

28. The suspension system according to claim 23, further comprising a second trailing arm connected between the first hanger bracket and the axle assembly.

29. The suspension system according to claim 28, wherein each of the first and second trailing arms is angled laterally outward relative to the frame as the arm extends from the frame to the axle assembly.

30. The suspension system according to claim 29, wherein one of the first and second arms is angled laterally outward relative to the frame greater than the other of the first and second arms.

31. A suspension system for a vehicle having a generally longitudinally extending frame, the suspension system comprising:
   an axle assembly;
   an upper trailing arm, one end of the upper arm being attached to the frame at a first pivot connection, and an opposite end of the upper arm being attached to the axle assembly at a second pivot connection, the upper arm being angled laterally outward from the frame as the upper arm extends from the first to the second pivot connection;
   a lower trailing arm, one end of the lower arm being attached to the frame at a third pivot connection, and an opposite end of the lower arm being attached to the axle assembly at a fourth pivot connection, the lower arm being angled laterally outward from the frame as the lower arm extends from the third to the fourth pivot connection;

first and second hanger brackets attached to the frame and extending downwardly therefrom; and a crossmember connected between the first and second hanger brackets, the crossmember being made of a composite material.

32. The suspension system according to claim 31, wherein the upper and lower trailing arms remain substantially parallel to each other as the axle assembly displaces vertically relative to the frame.

33. The suspension system according to claim 31, wherein the first, second, third and fourth pivot connections form vertices of a parallelogram.

34. The suspension system according to claim 31, further comprising a lift mechanism for lifting the axle assembly vertically relative to the frame.

35. The suspension system according to claim 34, wherein the lift mechanism includes a lever arm attached to the third pivot connection.

36. The suspension system according to claim 35, wherein the lift mechanism further includes a lift air spring connected between the frame and the lever arm.

37. The suspension system according to claim 31, wherein the upper and lower arms are pivotably connected to the first hanger bracket at the first and third pivot connections, respectively.

38. The suspension system according to claim 31, wherein the third pivot connection comprises the lower trailing arm pivotably supported between the first hanger bracket and the crossmember.

39. The suspension system according to claim 31, wherein each of the first and second hanger brackets are made of a composite material.

40. The suspension system according to claim 31, wherein the second and fourth pivot connections are laterally offset relative to each other.

41. The suspension system according to claim 31, wherein the first and third pivot connections are laterally offset relative to each other.

42. The suspension system according to claim 31, wherein each of the upper and lower trailing arms is angled laterally outward relative to the frame as the arm extends from the frame to the axle assembly, and wherein one of the upper and lower arms is angled laterally outward relative to the frame greater than the other of the upper and lower arms.

43. A suspension system for a vehicle having a generally longitudinally extending frame, the suspension system comprising:

an axle assembly;

first and second hanger brackets attached to the frame and extending downwardly therefrom, each of the first and second hanger brackets being made of a composite material;

a crossmember attached to each of the first and second hanger brackets; and at least one first trailing arm pivotably connected to the first hanger bracket at a pivot connection, the pivot connection extending between the first hanger bracket and the crossmember, and the first trailing arm further being pivotably connected to the axle assembly.

44. The suspension system according to claim 43, wherein the pivot connection includes a pivot pin extending between the first hanger bracket and a pivot mounting bracket of the crossmember.

45. The suspension system according to claim 43, further comprising at least one second trailing arm, the first and second trailing arms being vertically spaced apart and remaining substantially parallel to each other as the axle assembly displaces vertically relative to the frame.

46. The suspension system according to claim 43, further comprising a lift mechanism for lifting the axle assembly vertically relative to the frame.

47. The suspension system according to claim 46, wherein the lift mechanism includes a lever arm attached to the pivot connection.

48. The suspension system according to claim 47, wherein the lift mechanism further includes a lift air spring connected between the frame and the lever arm.

49. The suspension system according to claim 43, further comprising at least one second trailing arm vertically spaced apart from the first trailing arm, the second trailing arm being pivotably connected to the axle assembly and to the first hanger bracket, each of the first and second trailing arms being angled laterally outward relative to the frame as the arm extends from the frame to the axle assembly.

50. The suspension system according to claim 49, wherein one of the first and second arms is angled laterally outward relative to the frame greater than the other of the first and second arms.

51. The suspension system according to claim 43, wherein the crossmember is made of a composite material.

* * * * *